(12) United States Patent
Yanobe

(10) Patent No.: US 10,267,659 B2
(45) Date of Patent: Apr. 23, 2019

(54) ANGLE DETECTING DEVICE AND SURVEYING INSTRUMENT

(71) Applicant: TOPCON Corporation, Tokyo-to (JP)

(72) Inventor: Satoshi Yanobe, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 362 days.

(21) Appl. No.: 15/361,703

(22) Filed: Nov. 28, 2016

(65) Prior Publication Data

US 2017/0160108 A1 Jun. 8, 2017

(30) Foreign Application Priority Data

Dec. 7, 2015 (JP) ................................ 2015-238381

(51) Int. Cl.
| | |
|---|---|
| *G01B 11/26* | (2006.01) |
| *G01D 5/347* | (2006.01) |
| *G01C 3/08* | (2006.01) |
| *G01S 17/10* | (2006.01) |
| *G01S 17/42* | (2006.01) |
| *G01S 7/481* | (2006.01) |

(52) U.S. Cl.
CPC ........... *G01D 5/34776* (2013.01); *G01C 3/08* (2013.01); *G01S 7/4817* (2013.01); *G01S 17/10* (2013.01); *G01S 17/42* (2013.01)

(58) Field of Classification Search
CPC .... G01D 5/34776; G01C 3/08; G01S 7/4817; G01S 17/10; G01S 17/42
See application file for complete search history.

(56) References Cited

U.S. PATENT DOCUMENTS

| | | | | |
|---|---|---|---|---|
| 6,037,734 | A | * 3/2000 | Toyomura | ............... H02P 23/16 318/254.2 |
| 2005/0249395 | A1 | * 11/2005 | Miller | ................... G06T 7/0004 382/145 |
| 2009/0153889 | A1 | * 6/2009 | Boness | .............. G03G 15/1605 358/1.9 |
| 2012/0105824 | A1 | 5/2012 | Ohtomo et al. | |

FOREIGN PATENT DOCUMENTS

| | | |
|---|---|---|
| JP | 60-157014 A | 8/1985 |
| JP | 2012-93245 A | 5/2012 |

* cited by examiner

*Primary Examiner* — Samantha K Abraham
(74) *Attorney, Agent, or Firm* — Nields, Lemack & Frame, LLC

(57) ABSTRACT

The invention provides an angle detecting device, which comprises absolute encoders provided on a rotation member which rotates at a constant speed, a clock signal generating component, a counter circuit, an angle calculating component, and a trigger signal generating component, wherein an angle trigger signal is inputted to the absolute encoders and the counter circuit at a predetermined time interval, the absolute encoders input rotation angles for each angle trigger signal to the angle calculating component, the counter circuit outputs the number of clock counts to the angle calculating component from the moment when a rotation angle measuring trigger signal is inputted by inputting the rotation angle measuring trigger signal for detecting the rotation angle of the rotation member to the counter circuit, and wherein the angle calculating component detects the rotation angle of the rotation member based on the rotation angles from the absolute encoders and on the number of the clock counts.

3 Claims, 4 Drawing Sheets

ANGLE DETECTING DEVICE AND SURVEYING INSTRUMENT

BACKGROUND OF THE INVENTION

The present invention relates to an angle detecting device which can perform an angle detection at high speed by using an absolute encoder and a surveying instrument provided with the angle detecting device.

A total station or a laser scanner is known as a surveying instrument, for instance. In the total station, a distance measuring light is projected to a measuring point, a distance measurement and an angle measurement are carried out on the measuring point, and three-dimensional data of the measuring point is acquired. Further, in the laser scanner, a pulsed light is projected as a distance measuring light, the laser scanner rotatably scans in a horizontal direction while rotatably scanning in a vertical direction at a constant speed, and three-dimensional point cloud data is acquired on a predetermined area or on an object to be measured.

Normally, an absolute encoder is used for the angle measurement (a measurement of a horizontal angle and a measurement of a vertical angle) in the total station. The absolute encoder has a pattern for an angle detection (a scale pattern), can measure an absolute angle, and is available at low cost. Further, although the absolute encoder can perform the angle measurement with high accuracy and with high reliability, the absolute encoder has such characteristics that a detection speed is low and is not used for a laser scanner which performs a measurement while rotating at high speed.

Further, normally, an incremental encoder is used for the laser scanner. The incremental encoder produces angle signals at an angle pitch as required, and an angle is detected by counting the angle signals. Although, the incremental encoder can perform the angle detection at high speed, a resolution of the angle signal itself is low, and it is necessary to increase the resolution by a signal processing.

SUMMARY OF THE INVENTION

It is an object of the present invention to provide an angle detecting device which can perform an angle detection at high speed by using an absolute encoder and a surveying instrument provided with the angle detecting device.

To attain the object as described above, an angle detecting device according to the present invention comprises absolute encoders provided on a rotation member which rotates at a constant speed, a clock signal generating component, a counter circuit, an angle calculating component, and a trigger signal generating component, wherein an angle trigger signal is inputted to the absolute encoders and the counter circuit at a predetermined time interval, the absolute encoders input rotation angles for each angle trigger signal to the angle calculating component, the counter circuit outputs the number of clock counts to the angle calculating component from the moment when a rotation angle measuring trigger signal is inputted by inputting the rotation angle measuring trigger signal for detecting the rotation angle of the rotation member to the counter circuit, and wherein the angle calculating component detects the rotation angle of the rotation member based on the rotation angles from the absolute encoders and on the number of the clock counts.

Further, in the angle detecting device according to the present invention, the rotation angles detected by the absolute encoders are assumed to be the rotation angle of the rotation member in a case where the rotation member is in a stopped condition or a rotation speed of the rotation member is lower than angle detection response speeds of the absolute encoders.

Furthermore, a surveying instrument according to the present invention comprises a light projecting unit for emitting a pulsed light and irradiating a distance measuring light, a light receiving unit for producing a light receiving signal by receiving a reflected distance measuring light, a distance measuring unit for performing a distance measurement based on the light receiving signal from the light receiving unit, a rotation deflecting unit for deflecting the distance measuring light in a horizontal direction, rotated in the horizontal direction and a vertical direction at the constant speed, and for rotatably irradiating the distance measuring light, the angle detecting device for detecting the rotation angle of the rotation deflecting unit, and an arithmetic control unit for controlling the distance measuring unit and the rotation deflecting unit, for scanning the distance measuring light and for calculating three-dimensional data of a measuring point based on the light receiving signal from the light receiving unit.

According to the present invention, the angle detecting device comprises absolute encoders provided on a rotation member which rotates at a constant speed, a clock signal generating component, a counter circuit, an angle calculating component, and a trigger signal generating component, wherein an angle trigger signal is inputted to the absolute encoders and the counter circuit at a predetermined time interval, the absolute encoders input rotation angles for each angle trigger signal to the angle calculating component, the counter circuit outputs the number of clock counts to the angle calculating component from the moment when a rotation angle measuring trigger signal is inputted by inputting the rotation angle measuring trigger signal for detecting the rotation angle of the rotation member to the counter circuit, and wherein the angle calculating component detects the rotation angle of the rotation member based on the rotation angles from the absolute encoders and on the number of the clock counts. As a result, even in a case where the rotation member is rotated at a higher speed than angle detection response speeds of the absolute encoders, the rotation angle can be detected.

Further, according to the present invention, the surveying instrument comprises a light projecting unit for emitting a pulsed light and irradiating a distance measuring light, a light receiving unit for producing a light receiving signal by receiving a reflected distance measuring light, a distance measuring unit for performing a distance measurement based on the light receiving signal from the light receiving unit, a rotation deflecting unit for deflecting the distance measuring light in a horizontal direction, rotated in the horizontal direction and a vertical direction at the constant speed, and for rotatably irradiating the distance measuring light, the angle detecting device for detecting the rotation angle of the rotation deflecting unit, and an arithmetic control unit for controlling the distance measuring unit and the rotation deflecting unit, for scanning the distance measuring light and for calculating three-dimensional data of a measuring point based on the light receiving signal from the light receiving unit. As a result, even in a case where the rotation member at high speed is comprised and point cloud data is acquired by scanning a predetermined area at high speed, it is possible to use the absolute encoder.

DETAILED DESCRIPTION OF THE PREFERRED EMBODIMENT

Figure 1:
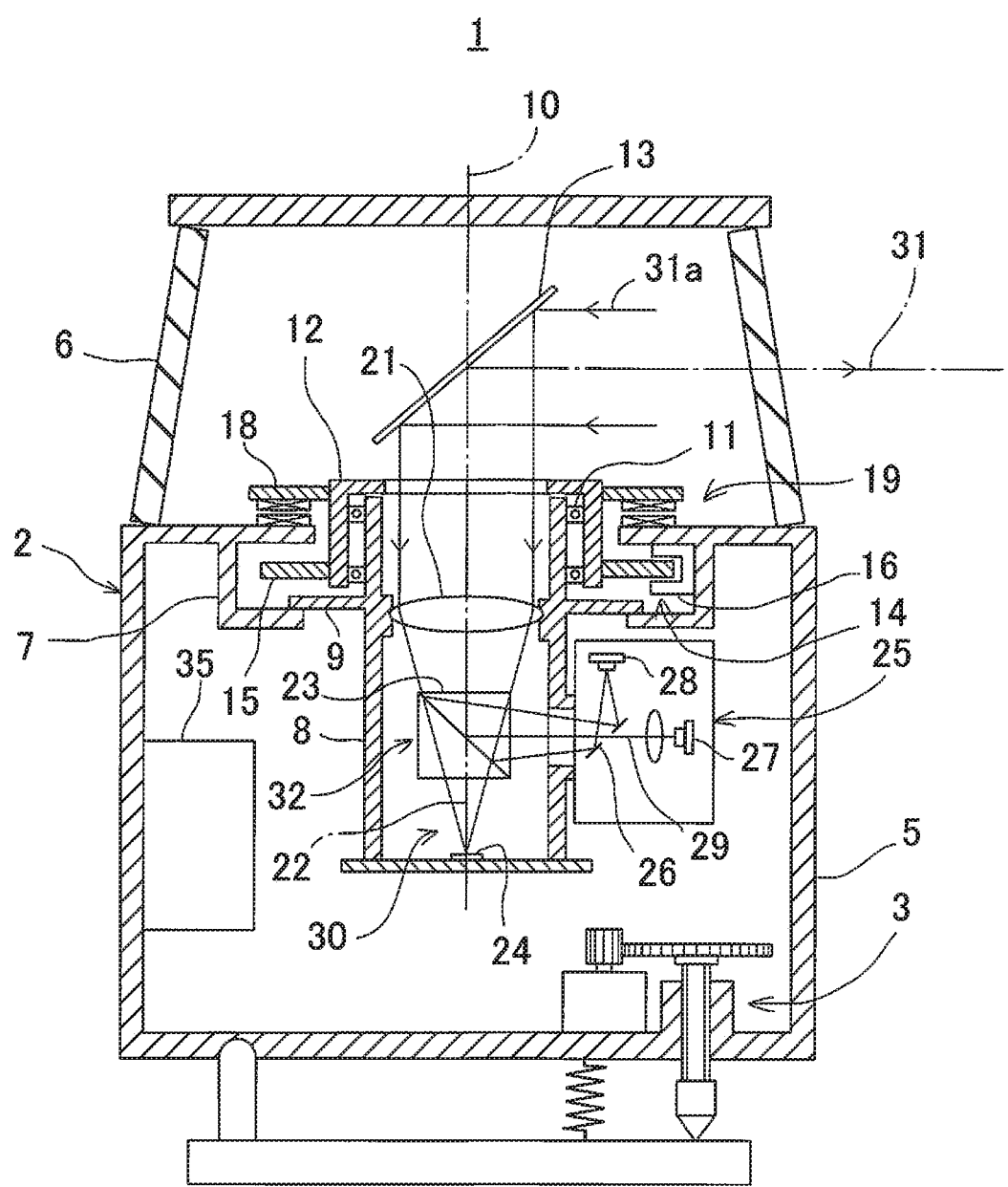
FIG. 1 is a cross-sectional view of a laser scanner according to an embodiment of the present invention.

A description will be given below on an embodiment of the present invention by referring to the attached drawings.

First, a description will be given on one example of a laser scanner in FIG. 1.

A laser scanner 1 is installed at a known point via a supporting unit such as a tripod (not shown), or the like. Further, the laser scanner 1 has a measuring device main body 2 and a leveling unit 3, and the leveling unit 3 can level the measuring device main body 2 in a horizontal condition.

The measuring device main body 2 has a main unit case 5 and an upper case 6 which covers an upper part of the main unit case 5. The upper case 6 is designed as a transparent member such as a glass, or the like over total circumference, and a distance measuring light can be projected through the transparent member.

A receiving seat 7 which forms a recessed portion is provided on an upper surface of the main unit case 5, and a lens barrel 8 which passes through the receiving seat 7 in a vertical direction is provided. The lens barrel 8 has a flange 9 spreading in a horizontal direction and is fixed on the receiving seat 7 via the flange 9.

A rotation member 12 is provided on an upper end portion of the lens barrel 8 via a bearing 11, and the rotation member 12 can be freely rotated around an axis 10 of the lens barrel 8 as a center. On the upper surface of the rotation member 12, a deflection mirror 13 is provided via a mirror holder (not shown). The deflection mirror 13 tilts with respect to the axis 10 and further is arranged to rotate integrally with the rotation member 12.

The rotation member 12 and the deflection mirror 13 make up a rotary deflection unit for deflecting and further rotatably irradiating a distance measuring light (to be described later).

Between the rotation member 12 and the receiving seat 7, a horizontal angle encoder 14 is provided as an angle detector for detecting a horizontal rotation angle of the rotation member 12. An absolute encoder is used as the horizontal angle encoder 14.

The horizontal angle encoder 14 has a scale disk 15 provided on the rotation member 12 and a detecting component 16 provided on a circumferential wall surface of the receiving seat 7.

The scale disk 15 is a disk in which a pattern for an angular scale is put on by a method such as printing, or the like on a transparent circular disk. As the pattern for the angular scale, for instance, a bar code is used, and an absolute angle from a reference position can be read.

The detecting component 16 comprises a light emitting element and an image sensor. The light emitting element issues an illuminating light, and the image sensor acquires the illuminating light passing through the scale disk 15 as a pattern image. By reading the pattern image as acquired by the image sensor, an angle is detected, and an angle reading signal is produced from the image sensor.

Based on this angle reading signal, a rotation angle (the absolute angle) from the reference position of the scale disk 15, i.e. the rotation angle from the reference position of the rotation member 12, is detected.

On an upper end of the rotation member 12, a rotating disk 18 which faces the upper surface of the main unit case 5 is provided. A horizontal motor 19 in a ring-like shape with the axis 10 as the center is provided between the rotating disk 18 and the upper surface of the main unit case 5, and the rotation member 12 is arranged so as to rotate horizontally at a constant speed by the horizontal motor 19.

The deflection mirror 13 is rotatably supported in the vertical direction via a horizontal shaft (not shown). Further, the deflection mirror 13 is rotated at the constant speed by a vertical motor 20 (to be described later; See FIG. 2) via the horizontal shaft, and further a vertical rotation angle of the deflection mirror 13 can be detected by a vertical angle encoder 33 (to be described later; See FIG. 2) via a rotation of the horizontal shaft. The vertical angle encoder 33 is designed as the absolute encoder similarly to the horizontal angle encoder 14.

An objective lens 21 is provided inside the lens barrel 8, and an optical axis 22 of the objective lens 21 coincides with the axis 10. Below the objective lens 21, a dichroic mirror 23, which is a wavelength splitting optical component, is provided on the optical axis 22. The dichroic mirror 23 has a reflection surface which allows a natural light to pass through and reflects the distance measuring light (to be described later), and an image pickup element 24 is provided on a transmission optical axis of the dichroic mirror 23. The objective lens 21, the dichroic mirror 23, and the image pickup element 24 make up an image pickup unit 30.

On a side surface of the lens barrel 8 and on a reflection optical axis 29 of the dichroic mirror 23, a distance measuring unit 25 is provided. A description will be given on the distance measuring unit 25.

A perforated mirror 26 is provided on the reflection optical axis 29, a light emitting component 27 is provided on the reflection optical axis 29 passing through the perforated mirror 26, and a distance measuring light receiving element 28 is provided opposite to the perforated mirror 26.

The light emitting component 27 emits a visible light or an invisible light, preferably pulsed emits a laser beam of the invisible light, as the distance measuring light. A distance measuring light 31 of a pulsed light as emitted passes through a hole of the perforated mirror 26, is reflected by the dichroic mirror 23, and is deflected on the optical axis 22. The distance measuring light 31 is further deflected in the horizontal direction by the deflection mirror 13 and is projected to an object to be measured.

A reflected distance measuring light 31a from the object to be measured is deflected by the deflection mirror 13 so as to become parallel to the optical axis 22, is further reflected by the dichroic mirror 23 and the perforated mirror 26, and is received by the distance measuring light receiving element 28. Based on a light receiving signal produced by the distance measuring light receiving element 28, a distance measurement is performed for each light pulse.

The deflection mirror 13, the objective lens 21, the dichroic mirror 23, the perforated mirror 26, and the like make up an optical system 32. Further, the light emitting component 27, the dichroic mirror 23, the objective lens 21 and the deflection mirror 13 make up a light projecting unit, and further the deflection mirror 13, the objective lens 21, the dichroic mirror 23, and the distance measuring light receiving element 28 make up a light receiving unit.

It is to be noted that in FIG. 1, reference numeral 35 denotes an arithmetic control unit.

Figure 2:
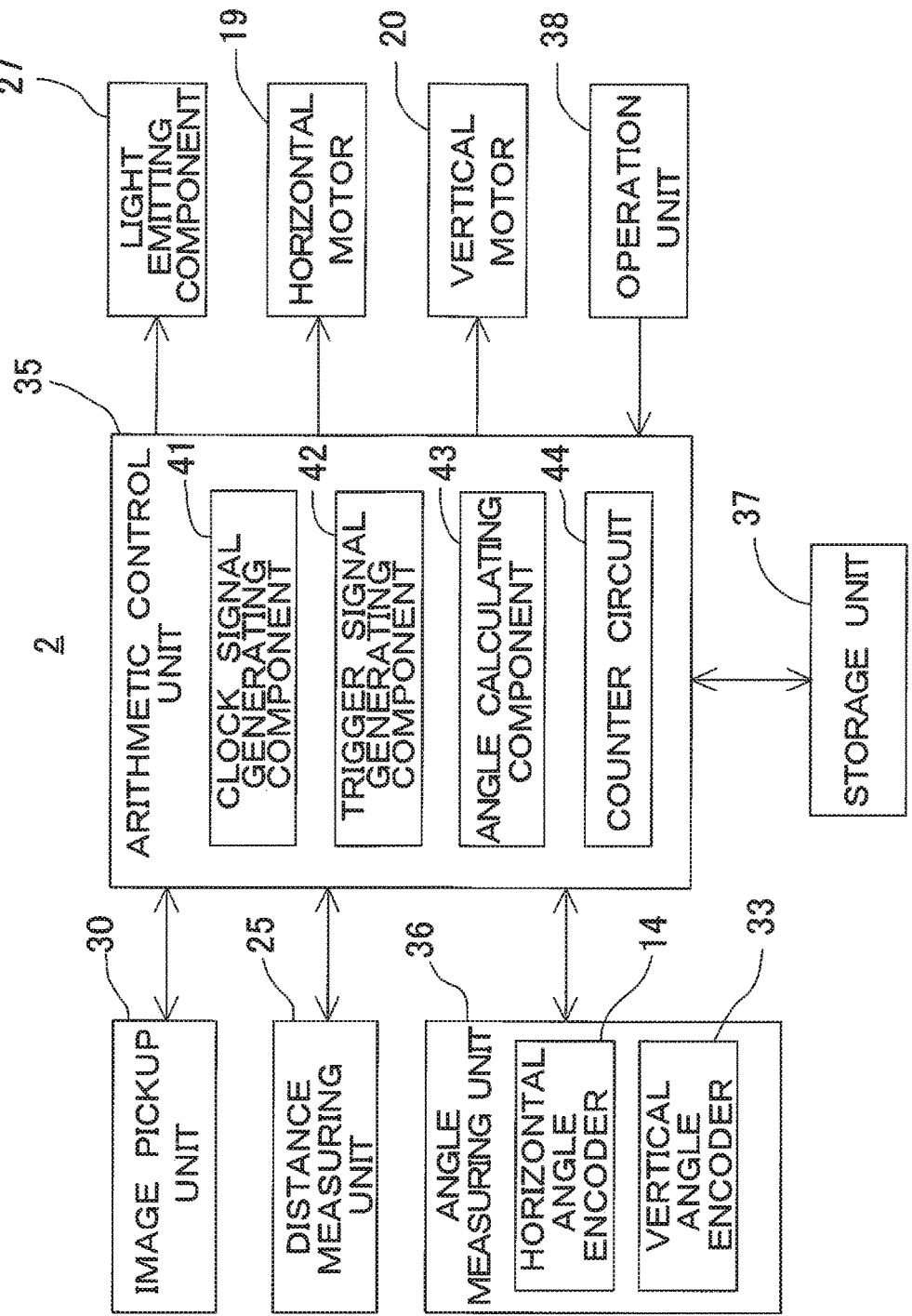
FIG. 2 is a schematical block diagram of a measuring device main body.

Referring to FIG. 2, a description will be given on an approximate arrangement of the measuring device main body 2.

The measuring device main body 2 primarily comprises the horizontal motor 19, the image pickup unit 30, the distance measuring unit 25, the light emitting component 27, the arithmetic control unit 35, an angle measuring unit 36, a storage unit 37, an operation unit 38, and the like.

Further, the arithmetic control unit 35 includes a clock signal generating component 41, a trigger signal generating component. 42, an angle calculating component 43, and a counter circuit 44. The angle measuring unit 36 includes the horizontal angle encoder 14 and the vertical angle encoder 33, and detects a projecting direction (a directional angle) of the distance measuring light 31.

The storage unit 37 has a program storage region and a data storage region. In the program storage region, various types of programs are stored. These programs include: a distance measuring program for making the measuring device main body 2 execute a series of measuring operations, an image processing program for processing signals produced from the image pickup element 24 to image signals and for storing the image signals in the storage unit 37 as image data, an angle measuring program for calculating the rotation angle based on angle signals inputted from the angle measuring unit 36, and other programs.

The arithmetic control unit 35 performs a constant speed rotation control of the horizontal motor 19, the constant speed rotation control of the vertical motor 20, and a pulse emission control of the light emitting component 27 according to programs such as the distance measuring program, the angle measuring program, or the like, calculates a distance based on the light receiving signal of the distance measuring light receiving element 28, performs a control of a photographing by the image pickup element 24 and a control of a detection of the rotation angle based on the signals from the horizontal angle encoder 14 and the vertical angle encoder 33, and performs an angle measurement, or the like.

Next, a description will be given on the measurement operation by the laser scanner 1.

A measurement area is set by the operation unit 38. After the measurement area has been set, a distance measuring operation is carried out. Further, by the arithmetic control unit 35, the horizontal motor 19 and the vertical motor 20 are rotated at the constant speed and a predetermined speed, respectively.

A control signal for the distance measurement is produced from the arithmetic control unit 35 to the distance measuring unit 25. The light emitting component 27 is driven, and the distance measuring light 31 of the pulsed light is emitted. The distance measuring light 31 is projected via the optical system 32 and the deflection mirror 13.

The reflected distance measuring light 31a as reflected by the object to be measured is received via the deflection mirror 13 and the optical system 32, and a distance to the object to be measured is calculated by detecting a receiving of a light (the distance measurement). Further, a directional angle (a horizontal angle and a vertical angle) at a moment of a detection of the receiving of the light is calculated based on the signal from the angle measuring unit 36 (the angle measurement). Therefore, three-dimensional coordinates of a measuring point can be obtained by measuring the distance and an angle of the projecting direction as calculated.

Further, while emitting the pulsed light, the rotation member 12 is rotated horizontally at the constant speed by the horizontal motor 19, and further the deflection mirror 13 is rotated in the vertical direction at the constant speed by the vertical motor 20. The pulsed light is scanned in the measurement area. By measuring distance data and the directional angles for each pulsed light, point cloud data having distance measurement data and angle measurement data can be acquired.

Figure 3:
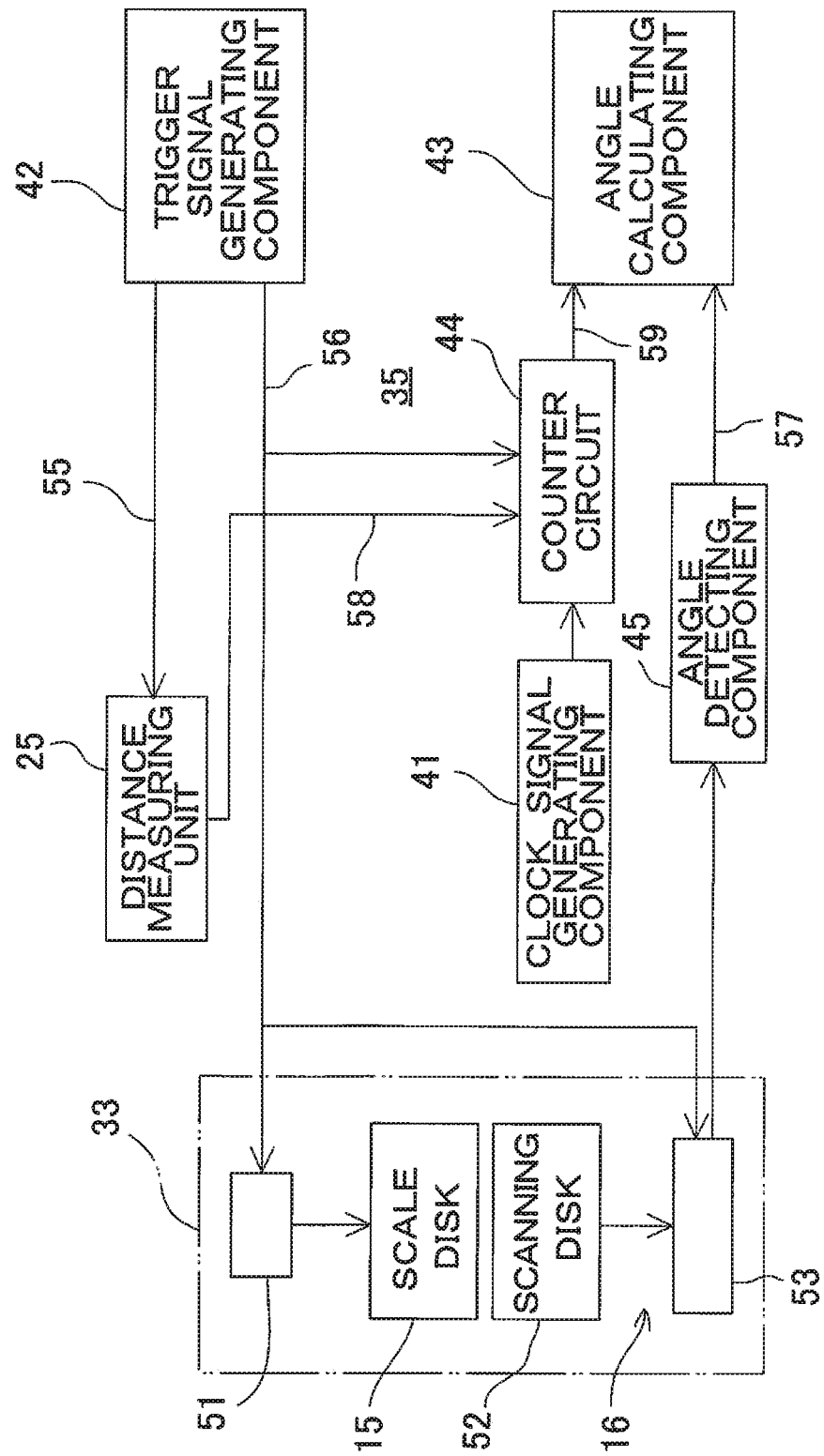
FIG. 3 is a schematical block diagram of an angle detecting device.
Figure 4:
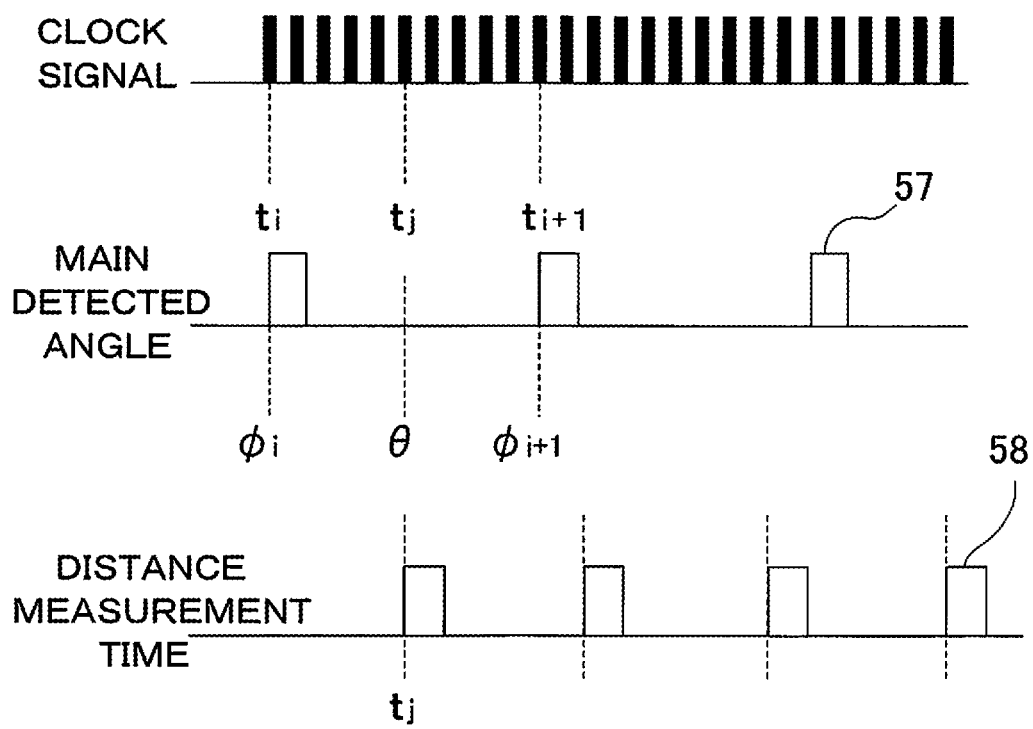
FIG. 4 is an explanatory drawing of an angle measurement in the angle detecting device.

Next, referring to FIG. 3 and FIG. 4, a description will be given on a case where the horizontal angle and the vertical angle are measured at high speed.

The angle measuring unit 36 detects the horizontal angle based on the signal outputted from the horizontal angle encoder 14, and detects the vertical angle based on the signal outputted from the vertical angle encoder 33. It is to be noted that since the horizontal angle encoder 14 and the vertical angle encoder 33 have a similar structure and further detect the angles by a similar processing, a description will be given below on the vertical angle encoder 33 for detecting the vertical rotation angle of the deflection mirror 13 which rotates at high speed.

The vertical angle encoder 33 has a scale disk 15 provided on a rotation side and a detecting component 16 provided on a fixed side.

The detecting component 16 has a light emitting element 51 for emitting the illuminating light, a scanning disk 52 provided facing the scale disk 15, and an image sensor 53. On the scanning disk 52, a pattern by which the pattern of the scale disk 15 is read as an angle is provided. The image sensor 53 is so designed to receive the illuminating light passing through the scale disk 15 and the scanning disk 52 as the pattern image.

A description will be given below on an angle detection at a time of a high speed rotation. It is to be noted that the deflection mirror 13 is controlled so as to rotate at the constant speed.

A control signal 55 is inputted from the trigger signal generating component 42 to the distance measuring unit 25. The distance measuring light 31 is projected from the distance measuring unit 25 via the deflection mirror 13. The distance measuring unit 25 receives the reflected distance measuring light 31a reflected by the object to be measured and performs the distance measurement.

Further, from the trigger signal generating component 42, an angle trigger signal 56 for the angle detection is inputted to the vertical angle encoder 33 at a predetermined time interval (an equal time interval).

Each time the angle trigger signal 56 is inputted, the vertical angle encoder 33 makes the light emitting element 51 emit. The pattern image at the time of inputting the angle trigger signal 56 is acquired by the image sensor 53 and is outputted to an angle detecting component 45. The angle detecting component 45 detects the rotation angle from the pattern image. The angle obtained from the pattern image is the absolute angle from the reference position (for instance, the reference position as set by the operation unit 38).

Therefore, when the scale disk 15 rotates at the constant speed and the angle trigger signal 56 is inputted at the equal time interval, the rotation angle as detected by the angle detecting component 45 is obtained at an equal angular interval. Further, if the time interval, at which the angle trigger signal 56 is produced, is set longer than a time which the angle detecting component 45 needs to perform the angle detection, the angle detection is carried out without any trouble even when the scale disk 15 is rotated at high speed.

The angle detected by the angle detecting component 45 is inputted to the angle calculating component 43 as a main detected angle 57. It is to be noted that a function of the angle detecting component 45 may be carried out by the angle calculating component 43, and the angle detecting component 45 may be omitted.

Next, a clock signal produced from the clock signal generating component 41 is inputted to the counter circuit. 44, and the clock signal is counted. The angle trigger signal 56 is inputted to the counter circuit 41 from the trigger signal generating component 42, and each time the angle trigger signal 56 is inputted, a count value is reset.

Further, from the distance measuring unit 25, a photodetection signal 58 as produced at the moment, which the reflected distance measuring light 31a is received, is inputted to the counter circuit 44.

The counter circuit 44 inputs the number of counts of the clock signals up to the moment, when the photodetection signal 58 is inputted, to the angle calculating component. 43 as a count signal 59. The angle calculating component 43 calculates the rotation angle at the moment of the distance measurement (the moment when the reflected distance measuring light 31a is received) based on the main detected angle 57 from the angle detecting component 45 and on the count signal 59. It is to be noted that it would suffice if the main detected angle 57 outputted from the angle detecting component 45 is stored before and after the photodetection signal 58 is inputted, and in a case where the photodetection signal 58 is not inputted, the main detected angle 57 may be erased sequentially.

The photodetection signal 58 is a signal for detecting the rotation angle at the time of the receiving of the light and has a function as a rotation angle measurement trigger signal.

Further description will be given by referring to FIG. 4.

It is supposed that the time when the angle trigger signal 56 has been produced is "$t_i$" and that the time when the angle trigger signal 56 has been produced next is "$t_{i+1}$". Further, it is supposed that the time when the photodetection signal 58 has been produced is "$t_j$", and that "$t_j$" is produced between "$t_i$" and "$t_{i+1}$" ($t_i < t_j t_{i+1}$).

Further, it is supposed that a main detected angle at a time "$t_i$" is $\varphi_i$, a main detected angle at a time "$t_{i+1}$" is $\varphi_{i+1}$, and an angle at the time of the distance measurement is "θ".

A time duration from the time "$t_i$" to the time when the photodetection signal 58 is produced can be obtained by the number of counts of the clock signals, and the time "$t_j$" can be calculated from the number of the counts of the clock signals.

The main detected angle $\varphi_i$ at the time "$t_i$" and the main detected angle $\varphi_{i+1}$ at the time "$t_{i+1}$" can be detected by the angle detecting component 45. Further, because of the constant speed rotation, the rotation angle from the time "$t_j$" (the time of the distance measurement) can be obtained by dividing a difference between the main detected angle $\varphi_i$ and the main detected angle $\varphi_{i+1}$ in proportion to the time.

Therefore, a rotation angle θ at the time of the distance measurement can be obtained as:

$$\theta = [(t_j - t_i)/((t_{i+1}) - t_i)] \times (\varphi_{i+1} - \varphi_i) + \varphi_i$$

Thus, even if a detection speed of the vertical angle encoder 33 itself is low, it is possible to measure the rotation angle at the time of the high speed rotation and acquire the point cloud data while rotating at high speed as the laser scanner.

Next, in a case where the high speed rotation is not performed, that is, in a case where a rotation speed is lower than angle detecting speeds of the absolute encoders (a rotation speed is lower than angle detection response speeds of the absolute encoders) or in a case where a measurement of the measurement point is performed at rest, since as for the measurement of the rotation angle, the detection speeds of the horizontal angle encoder 14 and the vertical angle encoder 33 do not come to a matter of question, a normal angle detecting operation of the absolute encoders would suffice. That is, the measurement with high accuracy can be performed based on the image signal from the image sensor 53.

In the present embodiment, it is possible to perform the rotation angle detection with high accuracy by simple processing to count the clock signal by using the absolute encoder without performing complicated signal processing.

Further, it is needless to say that the angle detecting device of the present invention can be used not only as a surveying instrument but also as an angle detecting device of a device which rotates at the constant speed.

The invention claimed is:

1. An angle detecting device comprising; absolute encoders provided on a rotation member which rotates at a constant speed, a clock signal generating component, a counter circuit, an angle calculating component, and a trigger signal generating component, wherein an angle trigger signal is inputted to said absolute encoders and said counter circuit at a predetermined time interval, said absolute encoders input rotation angles for each angle trigger signal to said angle calculating component, said counter circuit outputs the number of clock counts to said angle calculating component from the moment when a rotation angle measuring trigger signal is inputted by inputting said rotation angle measuring trigger signal for detecting the rotation angle of said rotation member to said counter circuit, and wherein said angle calculating component detects the rotation angle of said rotation member based on the rotation angles from said absolute encoders and on the number of said clock counts.

2. The angle detecting device according to claim 1, wherein the rotation angles detected by said absolute encoders are assumed to be the rotation angle of said rotation member in a case where said rotation member is in a stopped condition or a rotation speed of said rotation member is lower than angle detection response speeds of said absolute encoders.

3. A surveying instrument comprising; a light projecting unit for emitting a pulsed light and irradiating a distance measuring light, a light receiving unit for producing a light receiving signal by receiving a reflected distance measuring light, a distance measuring unit for performing a distance measurement based on the light receiving signal from said light receiving unit, a rotation deflecting unit for deflecting said distance measuring light in a horizontal direction, rotated in the horizontal direction and a vertical direction at the constant speed, and for rotatably irradiating said distance measuring light, said angle detecting device according to claim 1 for detecting the rotation angle of said rotation deflecting unit, and an arithmetic control unit for controlling said distance measuring unit and said rotation deflecting unit, for scanning said distance measuring light and for calculating three-dimensional data of a measuring point based on the light receiving signal from said light receiving unit.

* * * * *